United States Patent [19]

Taylor

[11] Patent Number: 4,586,747
[45] Date of Patent: May 6, 1986

[54] UTILITY BOOSTER CHAIR

[75] Inventor: Beverly W. Taylor, Gasconade County, Mo.

[73] Assignee: Handi-Pac, Inc., Hermann, Mo.

[21] Appl. No.: 768,130

[22] Filed: Aug. 22, 1985

[51] Int. Cl.⁴ .............................................. A47D 1/10
[52] U.S. Cl. .................................... 297/250; 297/181; 297/338
[58] Field of Search ............... 297/250, 254, 338, 337, 297/181, 251

[56] References Cited

U.S. PATENT DOCUMENTS

| | | | |
|---|---|---|---|
| 2,290,329 | 7/1942 | Huffman et al. | 297/181 |
| 2,418,731 | 4/1947 | Seitz | 297/250 X |
| 2,515,527 | 7/1950 | Robinson | 297/250 X |
| 2,721,603 | 10/1955 | Faulconer | 297/338 |
| 4,109,961 | 8/1978 | Opsuik | 297/338 |

Primary Examiner—Francis K. Zugel
Attorney, Agent, or Firm—Polster, Polster and Lucchesi

[57] ABSTRACT

A utility booster chair including a back and a pair of spaced opposed arm members extending in substantially perpendicular relation therefrom, the chair being contour formed in the shape of an animal and having a platform adjustably connectable to the arm members for different heights and different usages.

2 Claims, 3 Drawing Figures

UTILITY BOOSTER CHAIR

BACKGROUND OF THE INVENTION

The present invention relates to furniture and, more particularly, to a chair for children with a platform extending between the arms thereof which can be adjustably connected to the arms for different heights and for different usages.

Adjustable chairs for children are generally well known in the furniture and toy arts. For the most part, these chairs have been heavy and complex to adjust and have been restricted in their usage and portability.

The present invention provides a utility booster chair which can be readily and economically manufactured and assembled with a minimum of parts and steps, which is light in weight for portability, which can be readily conformed to be physically attractive to children and which can be readily adjusted for differing heights, ages and usages. Various other features of the present invention will become obvious to one skilled in the art upon reading the disclosure set forth herein.

SUMMARY OF THE INVENTION

More particularly, the present invention provides a utility chair comprising: a back means; a pair of spaced opposed arm members extending in substantially perpendicular relation from the back means; a platform sized to extend in a horizontal fashion between the opposed arm members; and coupling means cooperatively mounted between the spaced opposed arm members and the platform to permit adjustable connection of the platform to the arm members for different heights and for different usages.

It is to be understood that various changes can be made in the arrangement, form and construction of the several parts of the apparatus disclosed herein without departing from the scope or spirit of the present invention. For example, it would be possible to provide longitudinally extending grooves in the platform sides and guide bars along the sides of the arm members and to use other spring loaded detent members to hold the platform in a selected position.

BRIEF DESCRIPTION OF THE DRAWINGS

Referring now to the drawings which disclose an advantageous embodiment of the utility chair of the present invention.

DESCRIPTION OF THE PREFERRED EMBODIMENT

Figure 1:
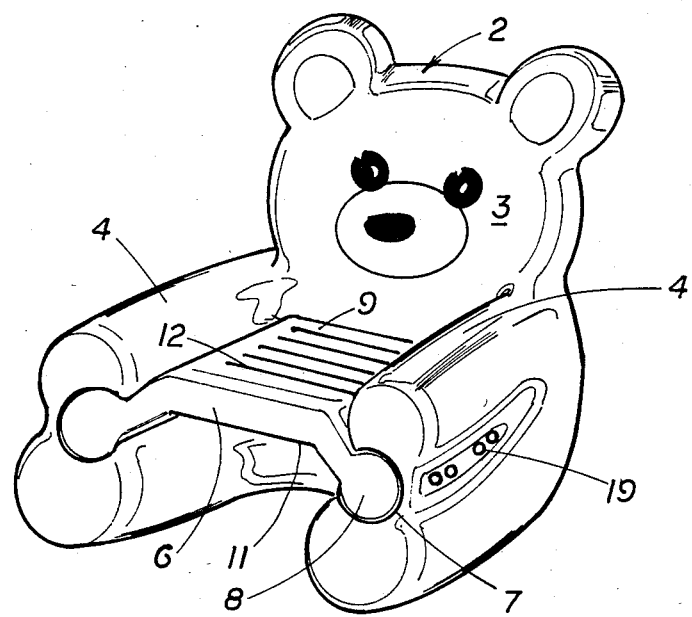
FIG. 1 is a perspective front end view of the present invention disclosing the novel utility chair in the form of a bear.

Referring to the drawings, the novel utility booster chair 2 is disclosed in the form of a bear. It is to be understood that other simulated animal or even other simulated popular figure forms such as a space chair or rocket could also be used. It further is to be understood that the several parts of the chair described herein can be formed from any one or more of several known materials and advantageously can be blown molded, injected molded or both from a suitable sturdy moldable plastic.

Chair 2 includes a back portion 3 and a pair of spaced opposed arm members 4 extending integral with and substantially perpendicular from back portion 3. As can be seen more readily in FIG. 2, back 3 and arm members 4 are disclosed as being in hollow form to reduce weight and materials, making the assembled chair light and easily portable. In like fashion platform 6 can also be of hollow form to reduce weight and materials.

Opposed arm members 4 are provided with opposed longitudinally extending slots 7 (only the front end of which can be seen in FIG. 1). The slots 7 serve to receive side bars 8 (FIG. 2) formed integrally with platform 6 to provide a coupling arrangement cooperatively mounted between spaced opposed arm members 4 and platform 6. The side bars 8 which are disclosed as tubular in shape are sized to nestingly engage in slots or grooves 7 in arm members 4. Although not disclosed in detail, slots 7 can be arranged to slope slightly downward from the horizontal from the front end of arm member 4 toward back 3. This slope serves to further prevent accidental disengagement of the platform from the arm members or the forward slipping of a child when seated on platform 6.

Figure 2:
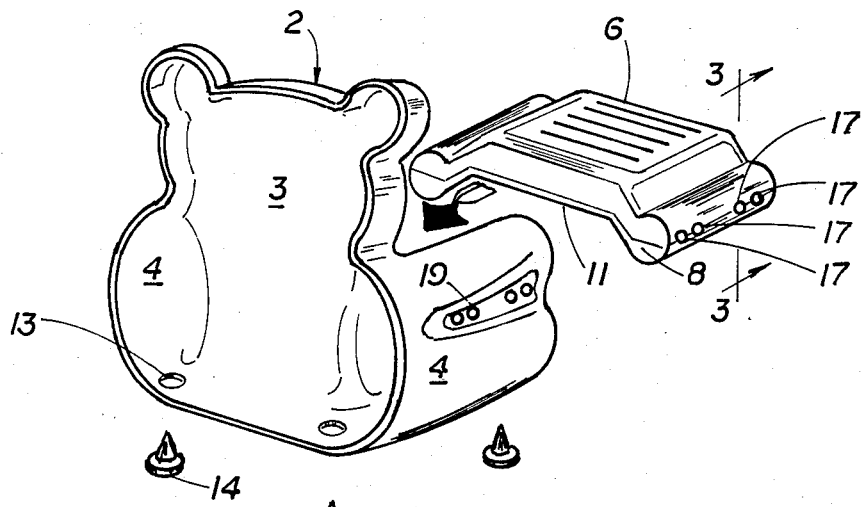
FIG. 2 is a perspective exploded rear end view of the utility chair of FIG. 1; and, FIG. 3 is an enlarged view through line 3—3 of FIG. 2 disclosing details of the adjustable spring loaded detent lock arrangement for the chair platform of FIGS. 1 and 2.
Figure 3:
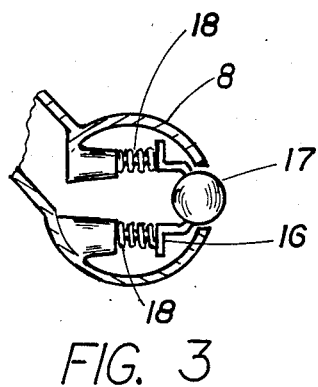

As also can be seen in FIGS. 1 and 2, the longitudinal axes of side bars 8 are spaced a different distance from a plane determining the opposite face 11 of platform 6 than from a plane determining the opposite face 11 of platform 6 to thus permit positioning of the platform at different height elevations when the platform is turned over. For example, when face 9 is upwardly turned, the elevation of platform 6 will be higher than when face 11 of platform 6 is upwardly turned. It also is to be noted that face 9 can be provided with spaced ribs 12 to enhance support strength and traction.

As can be seen in FIG. 2, the bottom of arms 4 can be provided with apertures 13 at either end to receive in snap fitting engagement therewith rubber feet 14 to enhance traction of the bottom surface of the chair.

To permit platform 6 to be locked in one of several positions so that the platform 6 can be electively used as a seat or a serving table, elongated detent bars 16 carrying spaced detents 17 thereon are mounted in hollow side bars 8. The detents 17 are spring-urged through bar 16 and coiled springs 18 to project through suitable apertures in side bars 8 and to yieldingly engage in appropriately spaced aperture sets 19 in arms 4 to allow the platform 6 to be slidably mounted into locked position on arms 4 either in cantilevered fashion as a serving table with a child positioned between back 4 and table 6 or to allow platform 6 to be slidably mounted into locked position fully within arms 4 as a seat, the height of such seat being determined by the relative positions of opposed faces 9 and 11. Thus, a novel utility chair is provided which can be readily manufactured and assembled, which is light in weight and which can be readily adjusted for height and for usage.

The invention claimed is:

1. A utility chair comprising: a back means; a pair of spaced opposed arm members extending substantially perpendicular from said back means; said arm members having opposed longitudinally extending slots disposed therein to slope slightly downward from the horizontal toward said back means; a platform sized to extend between said arm members, said platform having opposed longitudinally extending side bars integral therewith sized to longitudinally nest in slidable reaction with said opposed slots of said arm members whereby said platform can be slidably mounted between said arm members in a slightly sloping downward fashion toward said back means, the longitudinal axes of said side bars being spaced a different distance from a plane determining one face of said platform than from a plane determining the other face of said platform to permit positioning of said platform at different height elevations when said platform is turned over; said platform having at least one face ribbed to enhance support strength and traction; said back means, arm members and platform being formed from a molded plastic material hollowed to reduce chair weight and contoured in the shape of an animal; and spaced spring urged detents and detent receiving apertures disposed between said side bars of said platform and said arm members to permit locking of said platform in several elective positions whereby said platform can be used as a seat or serving table.

2. The apparatus of claim 1, said side arms having spaced rubber feet fastened to the bottom thereof to enhance traction.

* * * * *

UNITED STATES PATENT AND TRADEMARK OFFICE
CERTIFICATE OF CORRECTION

PATENT NO. : 4,586,747
DATED : May 6, 1986
INVENTOR(S) : Beverly W. Taylor

It is certified that error appears in the above-identified patent and that said Letters Patent is hereby corrected as shown below:

Column 2, line 28 should read "a plane determining face 9 of platform 6".

Signed and Sealed this

Second Day of September 1986

[SEAL]

Attest:

DONALD J. QUIGG

Attesting Officer

Commissioner of Patents and Trademarks